(12) United States Patent
Adams et al.

(10) Patent No.: US 7,251,727 B2
(45) Date of Patent: Jul. 31, 2007

(54) SYSTEM AND METHOD FOR SURELY BUT CONVENIENTLY CAUSING RESET OF A COMPUTERIZED DEVICE

(75) Inventors: Neil P. Adams, Ontario (CA); Herbert A. Little, Ontario (CA); Russell N. Owen, Ontario (CA)

(73) Assignee: Research In Motion Limited, Ontario (CA)

( * ) Notice: Subject to any disclaimer, the term of this patent is extended or adjusted under 35 U.S.C. 154(b) by 377 days.

(21) Appl. No.: 10/912,553

(22) Filed: Aug. 6, 2004

(65) Prior Publication Data

US 2005/0268084 A1 Dec. 1, 2005

Related U.S. Application Data

(60) Provisional application No. 60/567,796, filed on May 5, 2004.

(51) Int. Cl.
   *G06F 15/177* (2006.01)
(52) U.S. Cl. .......................... 713/2; 717/168
(58) Field of Classification Search .......... 713/2; 717/168
   See application file for complete search history.

(56) References Cited

U.S. PATENT DOCUMENTS 6,219,694 B1   4/2001  Lazaridis et al. ........... 709/206
6,721,713 B1   4/2004  Guheen et al. ................ 705/1
2004/0181787 A1* 9/2004  Wickham et al. ........... 717/168

FOREIGN PATENT DOCUMENTS

EP   1 300 761 A1   4/2003

OTHER PUBLICATIONS

"Deploying Microsoft Software Update Services"; Software Update Service Deployment White Paper; Microsoft Corporation Published Jan. 2003; pp. 1-98.
International Search Report App. No. PCT/CA2004/001479, dated Aug. 6, 2004.

* cited by examiner

*Primary Examiner*—Chun Cao
*Assistant Examiner*—Albert Wang
(74) *Attorney, Agent, or Firm*—Nixon & Vanderhye, PC

(57) ABSTRACT

Enhanced reset logic is included in a user's computerized device so that the device owner (e.g., the user's employer) can assure prompt reset (e.g., to insure device use of newly downloaded software versions or other control or security data) while still allowing user convenience (e.g., some limited continued normal use of the device before reset is forced upon the user thus permitting the user to avoid possibly aggravating losses of data and/or ongoing usage).

33 Claims, 9 Drawing Sheets

Your Device Owner has sent a required application to your device.
You must reset your device to complete the installation.

Notice 1 of 10

RESET NOW

RESET LATER

Fig. 6

Your Device Owner has sent a required application to your device.
You must reset your device to complete the installation.

Notice 10 of 10

RESET NOW

Fig. 7

SYSTEM AND METHOD FOR SURELY BUT CONVENIENTLY CAUSING RESET OF A COMPUTERIZED DEVICE

RELATED APPLICATIONS

This non-provisional application is based on our prior provisional application No. 60/567,796 filed May 5, 2004 entitled SYSTEM AND METHOD FOR PROVIDING A DEVICE RESET, the benefit of which is hereby claimed pursuant to 35 U.S.C. §119(c).

BACKGROUND

1. Technical Field

This invention relates generally to management of computerized devices, and more particularly, to a system and method for surely but conveniently causing reset of a computerized device.

2. Description of Related Art

Corporations (e.g., device owners) typically provide their employees (e.g., device users) with computerized devices, such as mobile communications devices, for their use. Devices may contain sensitive corporate information and may be able to access sensitive corporate information. In order to maintain a certain level of security for such information, the device owner may require that certain application computer programs be present on a user's device. Periodically, these applications must be replaced with more recent versions of the applications. In many cases, the application upgrade happens automatically, without the user knowing about it. Once an application has been upgraded to a new version, the device may need to be reset in order to ensure that the most recent version of the application program is presently being executed.

Users are typically also able to install third party applications onto the devices. These third party applications may or may not be approved of by the device owner. As such, applications running on the device typically are granted or denied certain privileges in order to control access to sensitive information. Periodically, the device owner may update the privileges on the device, e.g., by revoking existing privileges or granting new privileges for one or more applications. This also typically occurs automatically without the user knowing about it. However, for the new privileges to take effect, the device's computer system may need to be reset.

The situation may also be complicated if the user has not initiated the action which prompts the reset. In the case of downloading an application via the browser that requires a reset, the user initiated the action of the download and thus would not be surprised that a reset is required for the application to run. The situation primarily addressed here is one in which the user does not initiate the action that requires the reset. How can the required reset be completed surely but conveniently - e.g., without having the user lose his/her work (i.e., a message being composed) or think that the device is faulty (avoiding service calls) when the user did not initiate the action that prompted the reset?

In known systems, as illustrated in FIG. 3, when a device reset is required, the user is notified of the need for reset and is given an opportunity to reset the device immediately, or to do so later. A user may choose to reset his/her device when notified, or later if he/she has data to be saved prior to resetting the device. For example, the user may have been composing a message for transmission to a message recipient, or may have been taking part in a voice call with another party.

If the user chooses to reset the device later, he/she may either forget to reset the device or may choose not to, thereby allowing a potentially unsafe application or privilege to exist on the device and allowing an attacker to take advantage of the situation.

A further possible problem is that if the device reset operation was not initiated by the user, he/she may later assume that the device is not operating correctly, and may then contact the device owner unnecessarily.

In some known approaches, when new applications are installed the user is given the choice to reset now or later, only once. The reset is never forced, but if the user wants to run the new application correctly he/she is required to reset on his/her own time. However, this is not always sufficient because in many cases, reset is required to bring the device to a secure mode, meeting corporate specifications. In effect, such prior art reset is only a result of device user action and not device owner action.

SUMMARY

The exemplary embodiments of this invention provide more a convenient, user friendly, system and method for assuredly but conveniently resetting a computerized device. For example, a device owner may send a required device reset command to the device. A user of the device may be notified of the required reset, and after one or more predetermined delays (during which normal device use is still permitted) and/or a predetermined number of repeated notifications at such delay intervals, the user may be effectively forced to reset the device (or the device may automatically reset itself).

Those in the art will understand that this invention may be embodied in computer hardware, software and/or computer program storage media - and in all combinations and permutations of these.

As will be appreciated by those in the art, the systems and methods disclosed herein are capable of other and different embodiments, and several details of the exemplary embodiments are capable of modifications in various respects. Accordingly, the drawings and description of the preferred embodiments set forth below are to be regarded merely as illustrative examples in nature and not restrictive.

BRIEF DESCRIPTION OF THE DRAWINGS

FIG. 6 illustrates an exemplary notification screen dialog that may be provided to a device user according to the embodiment of FIG. 5.

FIG. 7 illustrates an exemplary final notification screen dialog that may be provided to a device user according to the embodiment of FIG. 5.

DETAILED DESCRIPTION OF EXEMPLARY EMBODIMENTS

Figure 1:
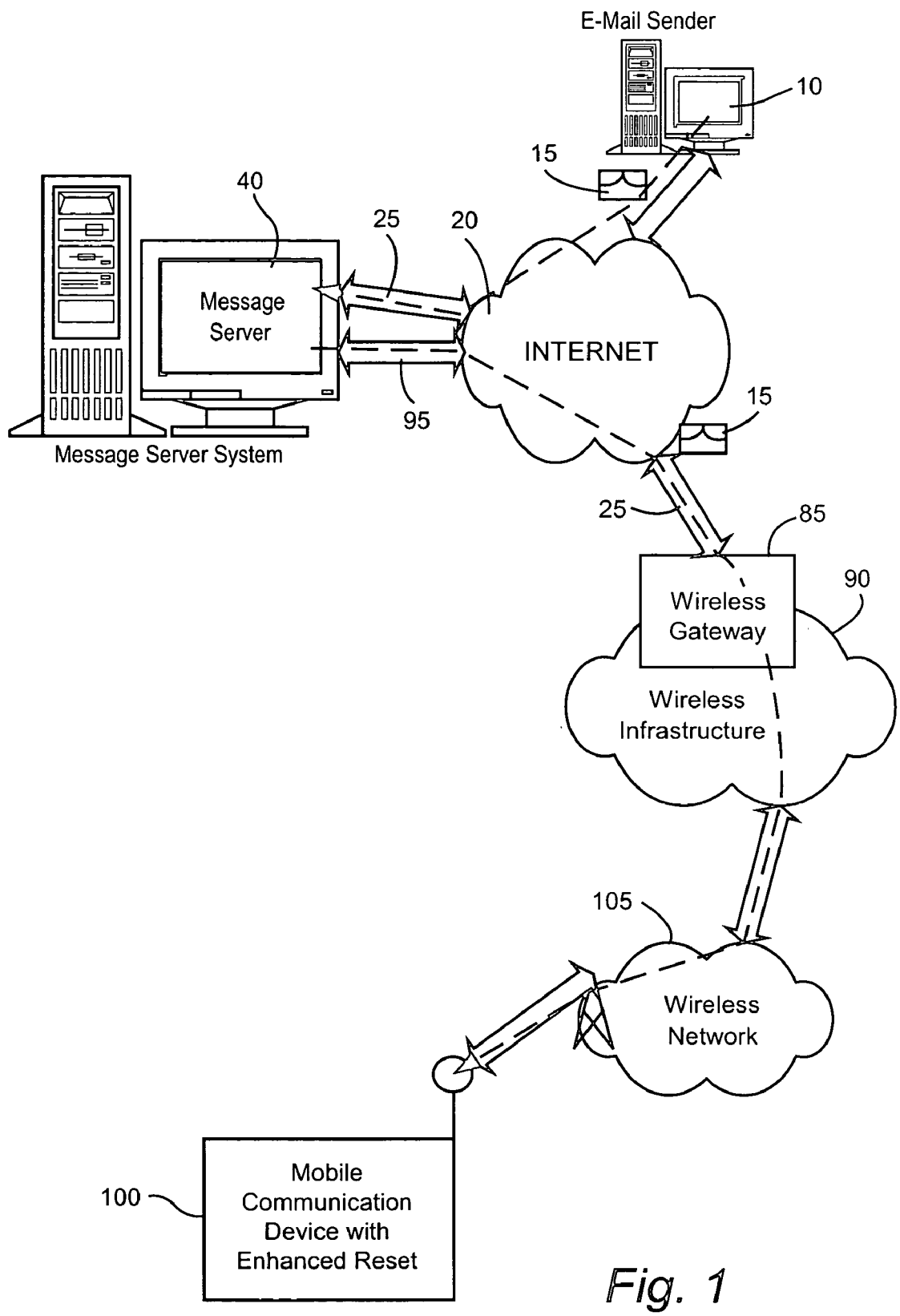
FIG. 1 is an overview of an exemplary communication system in which a wireless communication device of this invention may be used.

FIG. 1 is an overview of an exemplary communication system in which a wireless communication device may be used with this invention. Those skilled in the art will appreciate that there may be hundreds of different topologies, but the system shown in FIG. 1 helps demonstrate operation of encoded message processing systems and methods described in the present application. There may also be many message senders and recipients. The simple exemplary system shown in FIG. 1 is for illustrative purposes only, and shows perhaps the currently most prevalent Internet e-mail environment where security is not generally used.

FIG. 1 shows an e-mail sender 10, the Internet 20, a message server system 40, a wireless gateway 85, wireless infrastructure 90, a wireless network 105 and a mobile communication device 100 with enhanced reset in accordance with this invention.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the secure message processing described below. Message servers such as server 40 typically extend beyond just e-mail sending and receiving; they also include dynamic database storage engines that have predefined database formats for data such as calendars, to-do lists, task lists, e-mail and documentation.

The wireless gateway 85 and infrastructure 90 provide a link between the Internet 20 and wireless network 105. The wireless infrastructure 90 determines the most likely network for locating a given user's device and tracks the user as he/she roams between countries or networks. A message is then delivered to the user's mobile device 100 via wireless transmission, typically at a radio frequency (RF), from a base station in the wireless network 105 to the mobile device 100. The particular network 105 may be virtually any wireless network over which messages may be exchanged with a mobile communication device.

As shown in FIG. 1, a composed e-mail message 15 is sent by the e-mail sender 10, located somewhere on the Internet 20. This message 15 is normally fully in the clear and uses traditional Simple Mail Transfer Protocol (SMTP), RFC822 headers and Multipurpose Internet Mail Extension (MIME) body parts to define the format of the mail message. These techniques are all well known to those skilled in the art. The message 15 arrives at the message server 40 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment described in further detail below, messages addressed to a message server account associated with a host system such as a home computer or office computer which belongs to the user of a mobile device 100 are redirected from the message server 40 to the mobile device 100 as they are received.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
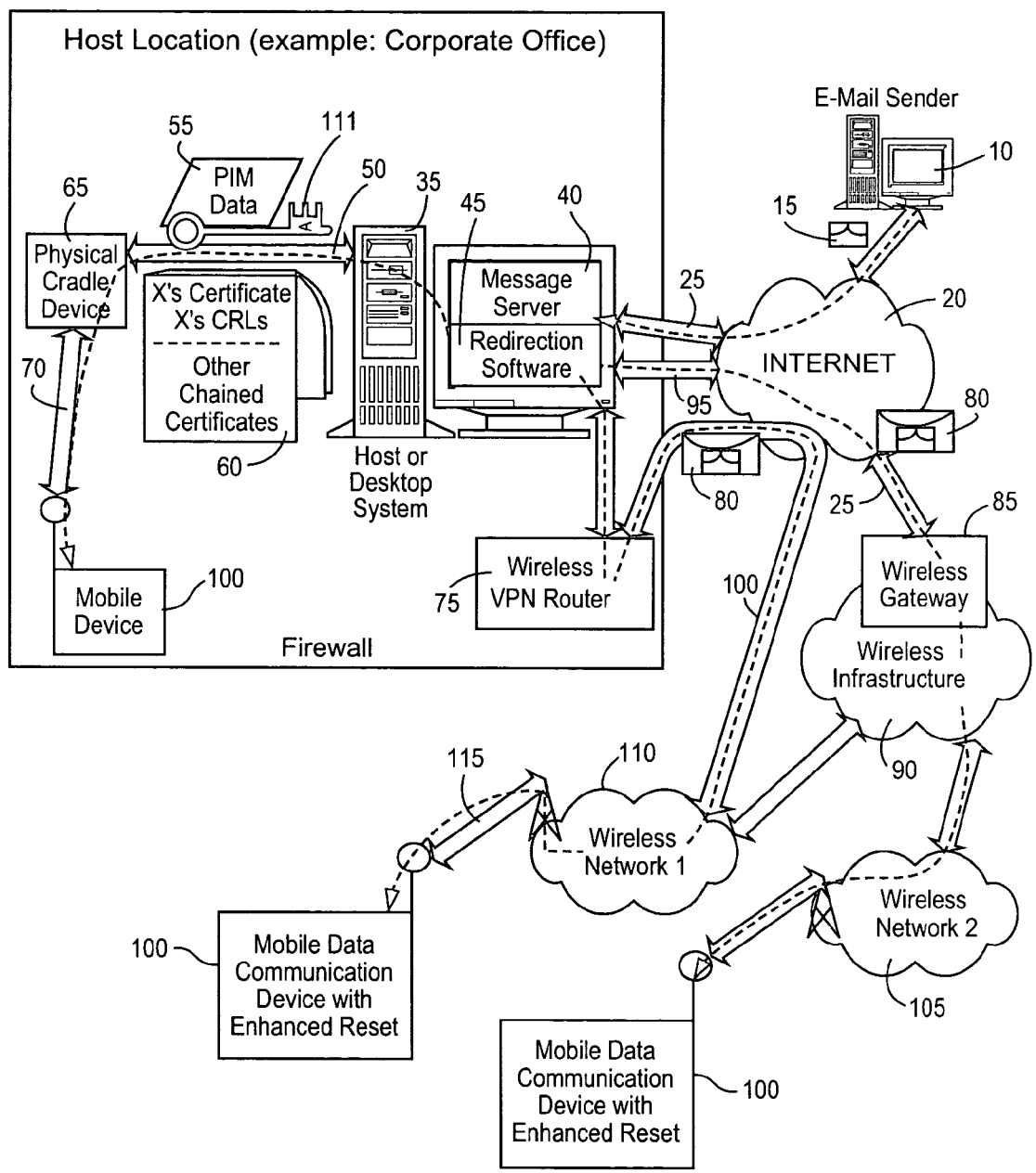
FIG. 2 is a block diagram of a further exemplary communication system including multiple networks and multiple mobile communication devices in which this invention may be used.
Figure 3:
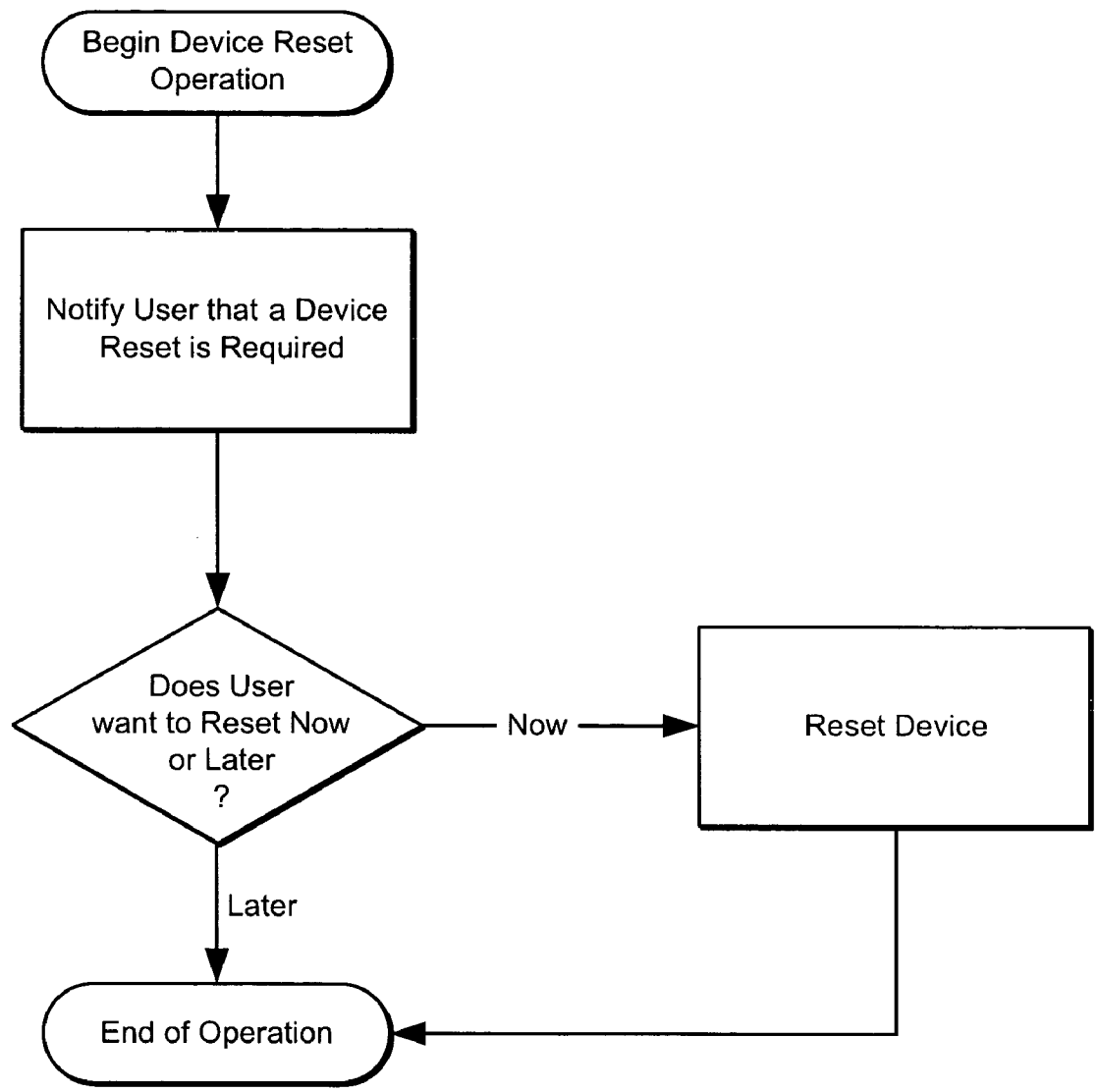
FIG. 3 illustrates an exemplary existing device reset operation.

FIG. 2 is a block diagram of a further exemplary communication system including multiple networks and multiple mobile communication devices. The system of FIG. 2 is substantially similar to the FIG. 1 system, but includes a host system 30, a redirection program 45, a mobile device cradle 65, a wireless virtual private network (VPN) router 75, an additional wireless network 110 and multiple mobile communication devices 100. As described above in conjunction with FIG. 1, FIG. 2 represents an overview of a sample network topology. Although the encoded message processing systems and methods described herein may be applied to networks having many different topologies, the network of FIG. 2 is useful in understanding an automatic e-mail redirection system mentioned briefly above.

The central host system 30 will typically be a corporate office or other LAN, but may instead be a home office computer or some other private system where mail messages are being exchanged. Within the host system 30 is the message server 40, running on some computer within the firewall of the host system, that acts as the main interface for the host system to exchange e-mail with the Internet 20. In the system of FIG. 2, the redirection program 45 enables redirection of data items from the server 40 to a mobile communication device 100. Although the redirection program 45 is shown to reside on the same machine as the message server 40 for ease of presentation, there is no requirement that it must reside on the message server. The redirection program 45 and the message server 40 are designed to co-operate and interact to allow the pushing of information to mobile devices 100. In this installation, the redirection program 45 takes confidential and non-confidential corporate information for a specific user and redirects it out through the corporate firewall to mobile devices 100. A more detailed description of the redirection software 45 may be found in the commonly assigned U.S. Pat. No. 6,219,694 ("the '694 patent"), entitled "System and Method for Pushing Information From A Host System To A Mobile Data Communication Device Having A Shared Electronic Address", issued to the assignee of the present application on Apr. 17, 2001 and which is hereby incorporated by reference into the present application. This push technique may use a wireless friendly encoding, compression and encryption technique to deliver all information to a mobile device, thus effectively extending the security firewall to include each mobile device 100 associated with the host system 30.

As shown in FIG. 2, there may be many alternative paths for getting information to the mobile device 100. One method for loading information onto the mobile device 100 is through a port designated 50, using a device cradle 65. This method tends to be useful for bulk information updates often performed at initialization of a mobile device 100 with the host system 30 or a computer 35 within the system 30. The other main method for data exchange is over-the-air using wireless networks to deliver the information. As shown in FIG. 2, this may be accomplished through a wireless VPN router 75 or through a traditional Internet connection 95 to a wireless gateway 85 and a wireless infrastructure 90, as described above. The concept of a wireless VPN router 75 is relatively new in the wireless industry and implies that a VPN connection could be established directly through a specific wireless network 110 to a mobile device 100. The possibility of using a wireless VPN router 75 has only recently been available and could be used when the new Internet Protocol (IP) Version 6 (IPV6) arrives into IP-based wireless networks. This new protocol will provide enough IP addresses to dedicate an IP address to every mobile device 100 and thus make it possible to push information to a mobile device 100 at any time. A principal advantage of using this wireless VPN router 75 is that it could be an off-the-shelf VPN component, thus it would not require a separate wireless gateway 85 and wireless infrastructure 90 to be used. A VPN connection would preferably be a Transmission Control Protocol (TCP)/IP or User Datagram Protocol (UDP)/IP connection to deliver the messages directly to the mobile device 100. If a wireless VPN 75 is not available then a link 95 to the Internet 20 is the most common connection mechanism available and has been described above.

In the automatic redirection system of FIG. 2, a composed e-mail message 15 leaving the e-mail sender 10 arrives at the message server 40 and is redirected by the redirection program 45 to the mobile device 100. As this redirection takes place the message 15 is re-enveloped, as indicated at 80, and a possibly proprietary compression and encryption algorithm can then be applied to the original message 15. In this way, messages being read on the mobile device 100 are no less secure than if they were read on a desktop workstation such as 35 within the firewall. All messages exchanged between the redirection program 45 and the mobile device 100 preferably use this message repackaging technique. Another goal of this outer envelope is to maintain the addressing information of the original message except the sender's and the receiver's address. This allows reply messages to reach the appropriate destination, and also allows the "from" field to reflect the mobile user's desktop address. Using the user's e-mail address from the mobile device 100 allows the received message to appear as though the message originated from the user's desktop system 35 rather than the mobile device 100.

With reference back to the port 50 and cradle 65 connectivity to the mobile device 100, this connection path offers many advantages for enabling one-time data exchange of large items. For those skilled in the art of personal digital assistants (PDAs) and data synchronization with a base computer, the most common data exchanged over this link is Personal Information Management (PIM) data 55. When exchanged for the first time this data tends to be large in quantity, bulky in nature and requires a large bandwidth to get loaded onto the mobile device 100 where it can be used on the road. This serial link may also be used for other purposes, including setting up a private security key 111 such as an S/MIME or PGP specific private key, the Certificate (Cert) of the user and their Certificate Revocation Lists (CRLs) 60. The private key is preferably exchanged so that the desktop 35 and mobile device 100 share one personality and one method for accessing all mail. The Cert and CRLs are normally exchanged over such a link because they represent a large amount of the data that is required by the device for S/MIME, PGP and other public key security methods.

Figure 4:
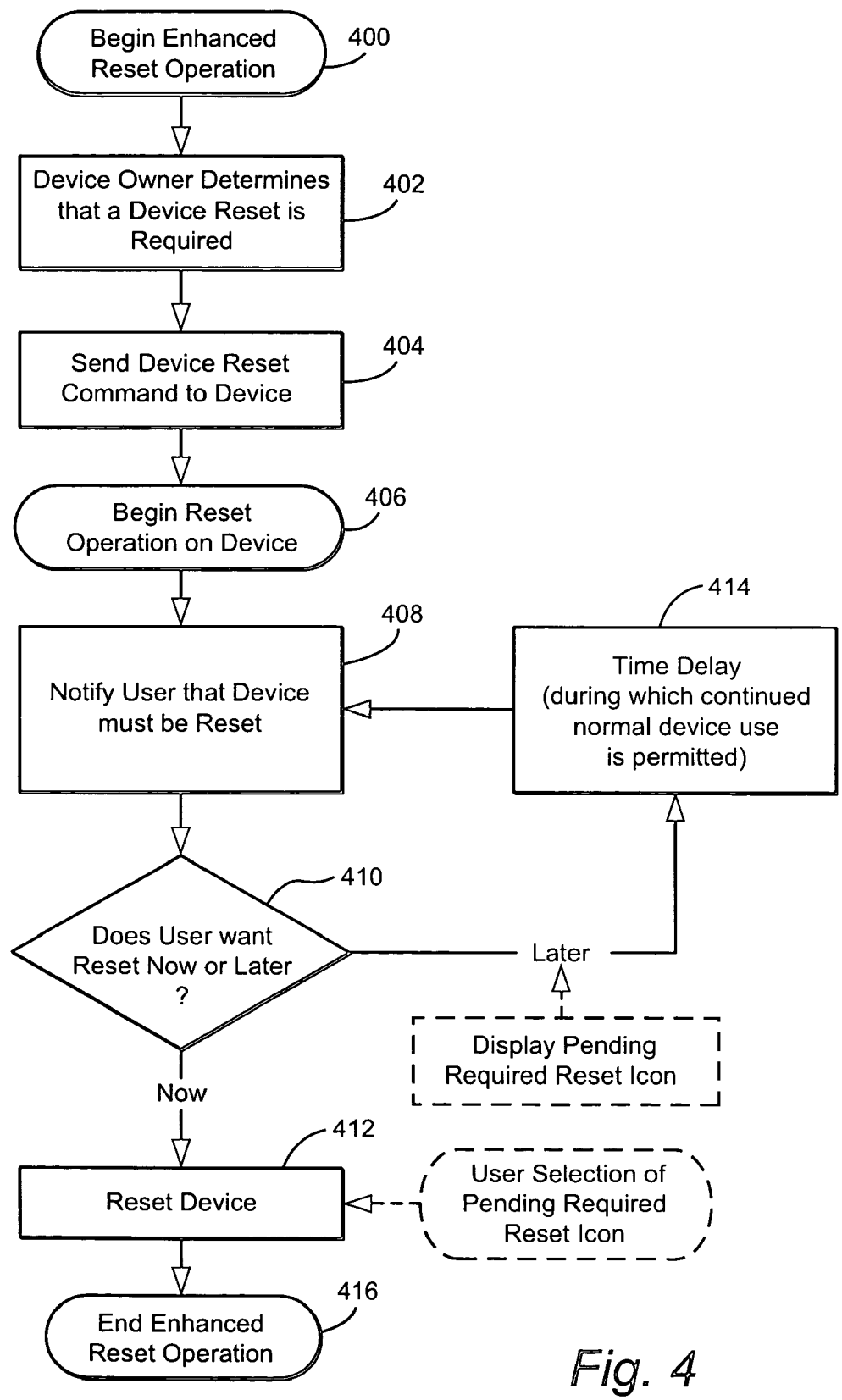
FIG. 4 illustrates an exemplary embodiment of an improved method (e.g., computer program logic) for causing device reset.

FIG. 4 illustrates an exemplary embodiment of an enhanced method for resetting device 10. A device owner enters the process at 400 and determines that a device reset is required at 402. A device reset may be required for a number of reasons. For instance, the device owner may have caused new information to be transmitted to the device 10 as is described in further detail below with reference to FIGS. 8 and 9. The new information may comprise a new version of an existing application that resides on the device, or it may comprise a new set of instructions relating to privileges available to applications that reside on the device. Exemplary privileges include the privilege to modify the contents of a key store containing cryptographic information. As will be obvious, malicious applications that are allowed to access and modify sensitive information such as the contents of the key store could compromise the security of a communication channel that the device is configured to operate on. In order for the new information transmitted by the device owner to take effect, the device should be reset.

When the device owner sends the reset command to the device and it is received at 404, the enhanced device reset operation begins at 406. The device first notifies the device user at 408 that a reset of the device must be performed. In a preferred embodiment, the notification further comprises an explanation of the need for the device reset. An exemplary notification screen is illustrated in FIG. 6, wherein the user is notified that a new application has been installed on the device by the device owner and that a device reset is required in order to complete installation.

The device user is presented with an option at 410 to reset the device immediately, or to reset the device later. If the user chooses to reset the device immediately, the device is reset at 412 and the enhanced reset operation is exited at 416. The user may also choose to reset the device later, in which case the device is not reset immediately but instead, a delay is effected at 414 before another notice of the need for reset is supplied to the user.

The user may choose not to reset the device immediately for many reasons. For instance, the user may have been composing a message while the device received the device reset command. If the device is reset immediately, the user risks losing information contained in the message. If the device is enabled for voice communications, the user also may have been in voice communication with one or more parties while the device received the device reset command. The user may not wish to end the call right away in order to reset the device. There are many other scenarios in which a user may need to delay a reset of the device.

If the user chooses at 410 to reset the device later, the system waits for a predetermined amount of time at 414 before a repeat notification is sent to the user. During such delay time period, the user may continue to utilize the device. However, until the reset operation is successfully ended at 416, a timed interrupt or watch dog timer or the like will re-enter the unfinished reset operation logic with an appropriate user notification at 408. The predetermined amount of time may be configured by the device owner through an IT Policy, as is described in further detail below with reference to FIGS. 8 and 9. This continues until the user resets the device and the enhanced reset operation is successfully ended and exited at 416.

Between reset notifications, a user might typically save their work. At such time a reset might be convenient to effect and this could be facilitated by displaying a reminder icon whenever a forced reset is sending. Then the user could at such a convenient time select the icon to effect the required sending reset so the user can avoid the possible nuisance of a future interruption (i.e., upon the next time out interval for a required reset notice). (See dotted line boxes in FIGS. 4 and 5).

In a preferred exemplary embodiment, in addition to the predetermined time delay, the user is only allowed a predetermined number of such delayed re-notifications. This is illustrated in FIG. 5 where operations similar to those already explained for FIG. 4 use the same reference numerals.

Figure 5:
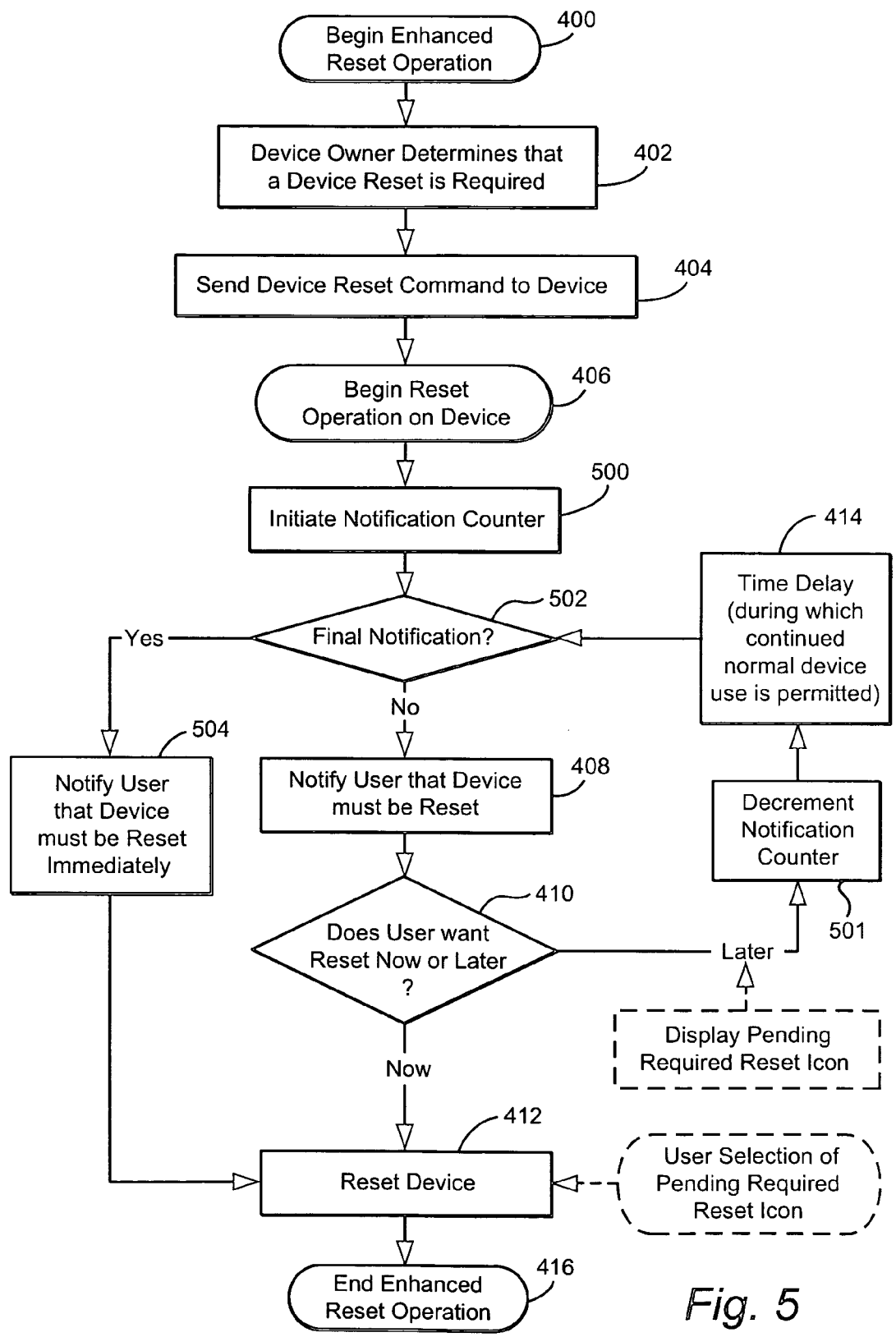
FIG. 5 illustrates an exemplary, presently preferred embodiment of another improved method (e.g., computer program logic) for causing device reset.

In the embodiment illustrated in FIG. 5, a notification counter is initiated at 500 (e.g., by setting a loop counter contents to equal N, the maximum permitted number of delays) and tracks the number of times that the user has been notified. If the number of notifications has not reached the maximum allowed notifications (as tracked by decrementing the loop notification counter at 501 and testing for zero each time through the loop at 502), the user is allowed to continue to delay the device reset. An exemplary notification screen is illustrated in FIG. 6. If the number of notifications has reached the maximum number of allowed notifications, then at 504 the user is given notification that the device must be reset immediately (at 412 either automatically or as a result of that being the only presented user option). An exemplary final notification/option screen is illustrated in FIG. 7. In this way, the user is provided a quite sufficient amount of time for effecting a convenient reset operation before being absolutely required (i.e., with no other option) to reset the device.

In order to prevent the user from losing work product, the user has to be warned that the device is going to be reset. The user also needs ample opportunity to be able to switch back to his/her application to save work (or finish composing his/her email, etc.). However, at some point, the user must be forced to reset without allowing any further postponement.

Of course, (as noted by the dotted line boxes in FIG. 5) this embodiment may also include display of a pending required reset icon which can be selectively satisfied at any convenient time thus avoiding the need for any future interruption for this purpose.

The number of interim notifications allowed, and the time delay period between notifications may be configured by the device owner, or may be otherwise preset when the device is provided to the user. This provides, among other things, corporate owners with the capability to customize the delay between notifications, and the number of interim notifications in order to suit its particular needs. Also, an IT administrator associated with the device owner can provide the same uniform settings to all mobile devices of the corporation (or to all within predetermined sets or classes of users), thereby ensuring that corporate mobile devices adhere to a consistent IT policy.

For example, one specific exemplary possibility is as follows:

When a required reset has been detected, the user is shown a message, "Your device requires a reset for the following reason [insert reason here]. If you have any unsaved work, choose Reset Later. Reminder 1 of 5." The user is given the options "Reset Now" and "Reset Later". If the user chooses "Reset Now", the device is reset right away. If the user chooses "Reset Later", they are given 10 minutes to save their work. In 10 minutes time the user is asked again to reset (Reminder 2 of 5). The user is given 4 opportunities to save their work. On the last reminder the user is not given the choice of "Reset Later". The only choice is "Reset Now". Of course, as noted previously, the number of reminders and period between reminders could be configurable by the administrator. This scheme gives the user ample time to save any work, enforces the reset to be done in a timely fashion and gives the use enough information to know that the device is not spontaneously resetting.

Some other less desirable approaches are:

1) Tell the user that the owner is going to reset the device in two minutes. This gives the user time to save work. However, the user may be doing something else in two minutes and that requires an almost immediate save of current work. Also the user may not have read the message in the dialog the first time, so the reset occurs as an unexpected event.

2) Wait for the next time the device is idle. That is, when there is no keyboard or roller wheel activity for 60 seconds, then the owner could force a reset of the device. However the user may still lose work. If the user is composing an email and put the device down for a few minutes, when he/she picks it up again the email composition is gone.

3) If the device has been idle for 15 minutes or is locked then force a reset provided the user is not in the middle of a phone call. However, this still may cause problems similar to those noted above.

As will be appreciated, the system and method of this invention (e.g., as schematically depicted in FIGS. 4-7 may be implemented by computer program software (logic) embodied in a suitable machine readable storage medium and/or in other hardware/software combinations and embodiments.

Figure 8:
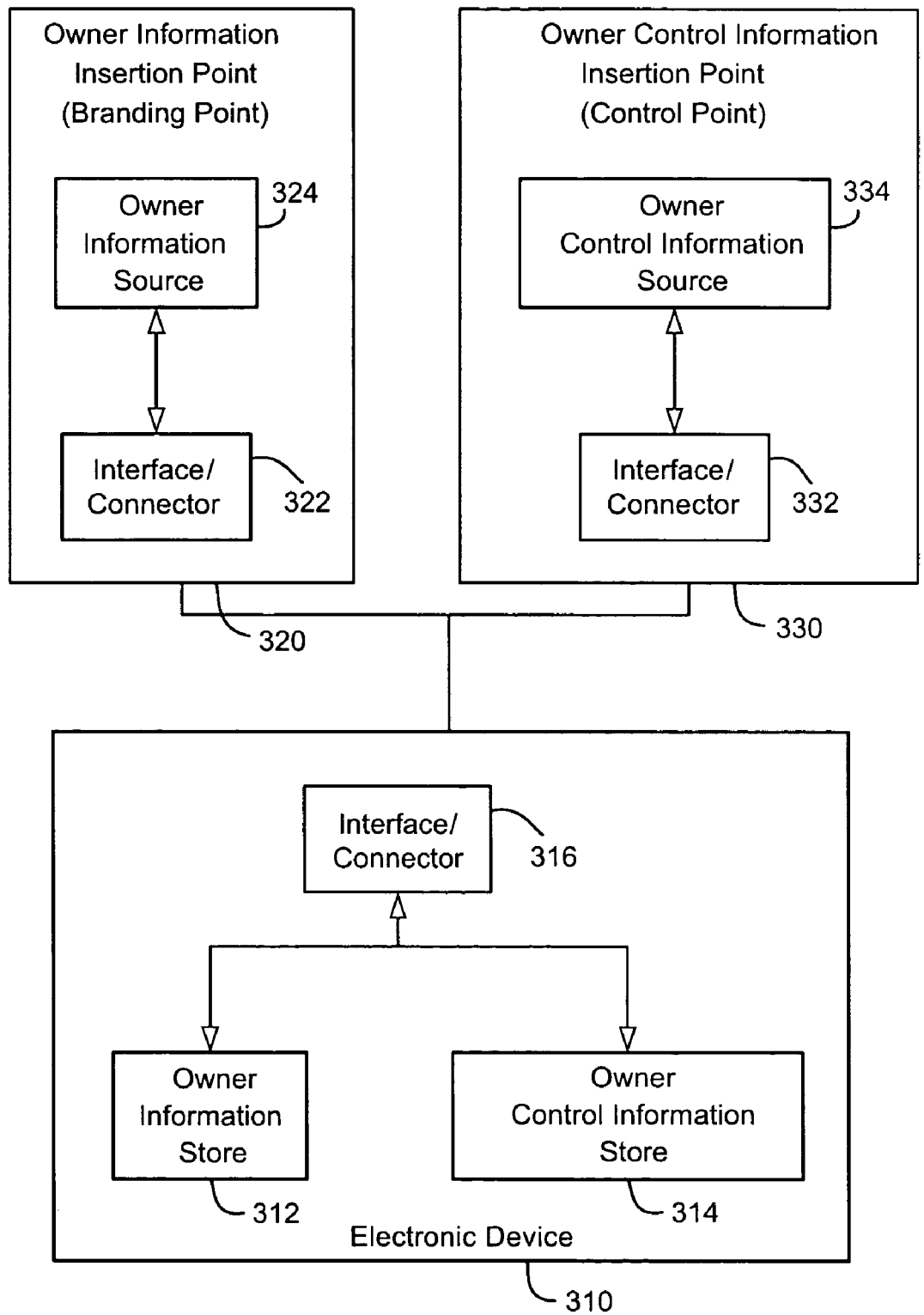
FIGS. 8-9 are exemplary block diagrams wherein digital certificate-related data is provided by an IT administrator to the embodiment of FIG. 5 or 6.
Figure 9:
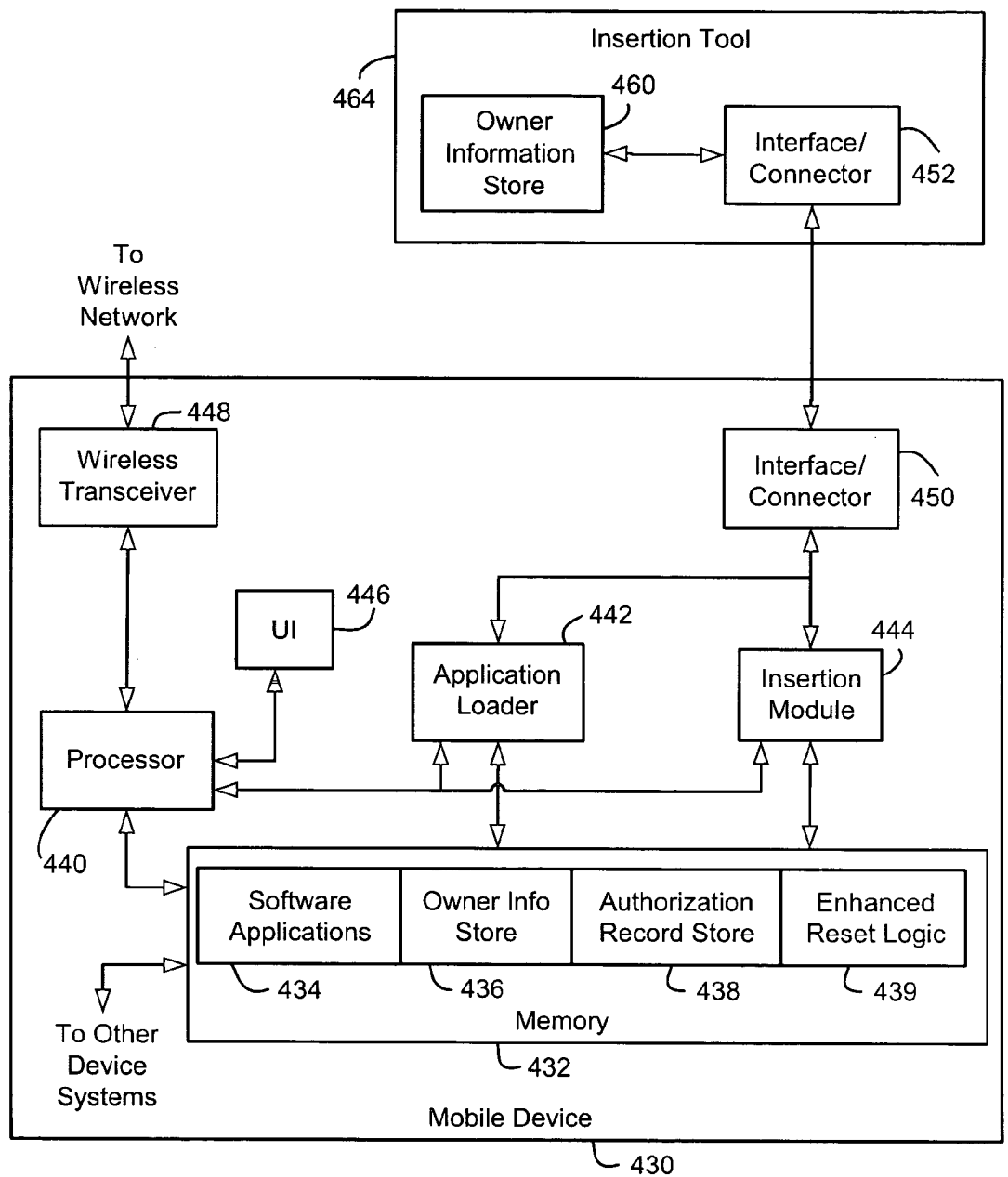

An IT policy can be enforced upon mobile devices in many ways. FIGS. 8 and 9 describe an example of this that is further described in the following commonly assigned United States patent application which is hereby incorporated herein by reference: "System And Method Of Owner Control Of Electronic Devices" (Ser. No. 10/732,132 filed on Dec. 10, 2003). The example illustrates how a user of the mobile device can be prevented from altering or erasing assurance periods specified by an IT administrator.

FIG. 8 is a block diagram illustrating an exemplary system of inserting owner information and owner control information (e.g., assurance period(s)) onto an electronic mobile device. The system in FIG. 8 includes an electronic device 310, an owner information insertion point 320, and an owner control information insertion point 330. The owner information insertion point 320 is alternatively referred to as a branding point, while the owner control insertion point 330 is alternatively referred to as a control point. An owner information store 312, an owner control information store 314, and an interface/connector 316 are provided in the electronic device 310. The owner information insertion point 320 includes an owner information source 324 and an interface/connector 322. The owner control information insertion point 330 similarly includes an owner control information source 334 and an interface/connector 332.

The owner information store 312 stores information, such as an owner name or other identification information, for example, which identifies an owner of the electronic device 310. The owner control information store 314 stores information that is used to control the operation of the electronic device 310. Owner control information may, for example, be specified in an authorization record that lists software applications authorized to be installed and executed on the electronic device 310 (e.g., such information can include that a digital certificate checking module 152 must be used and with a particular assurance period). The owner information source 324 and the owner control information source 334 could be local memory devices, communication modules through which remote memory devices storing owner information and owner control information are accessible, or possibly user interfaces through which owner information and owner control information are entered.

The interface/connector 322 is compatible with the interface/connector 316 to establish a communication link between the owner information insertion point 320 and the electronic device 310, to thereby enable owner information to be transferred to the electronic device 310 from the owner information source 324. The interface/connector 332 similarly enables transfer of owner control information from the owner control information source 334 onto the electronic device 310 via a communication link established between the interface/connectors 332 and 316. The interface/connectors 316, 322, and 332 may establish wired communication links, where the interface/connectors are serial ports, for example, or wireless communication links such as infrared links where the interface/connectors are infrared modules, or wireless communication networks. Owner information and owner control information transferred to a device are respectively inserted or stored in the owner information store 312 and the owner control information store 314.

The owner control insertion point 320 is associated with an owner of the electronic device 310. Where the electronic device 310 is provided to a user by an employer, for example, the owner control insertion point 320 may be a computer system or device controlled by a corporate computer system administrator or IT department. The electronic device 310 is "branded" with owner information by establishing a communication link between the owner information insertion point 320 and the electronic device 310 through the interface/connectors 322 and 316 and then inserting owner information into the owner information store 312. Unless otherwise desired, once owner information has been inserted onto the mobile device 310, then preferably only the owner or a party authorized by the owner is able to change the owner information or insert or change owner control information on the electronic device 310.

Because insertion of owner control information onto the electronic device 310 is restricted once owner information has been inserted, the owner control information insertion point 330 need not necessarily be controlled by the owner of the electronic device 310. When the owner maintains control over the owner control information insertion point 330, the insertion points 320 and 330 may be implemented in the same computer system or device and share the same interface/connector. However, separate insertion points 320 and 330 as shown in FIG. 8 allow an owner of the electronic device to delegate owner control information insertion to a trusted entity. If owner control information insertion is controlled using digital signatures, for example, an owner first brands the electronic device 310 and provides the electronic device 310 and digitally signed owner control information to a user. In this case, the owner control information insertion point 330 may be the user's computer system, which is then used to insert the digitally signed owner control information onto the electronic device 310.

In most implementations, the owner information insertion point 320 and the owner control information control point 330 include the same type of interface/connectors 322 and 332, compatible with the interface/connector 316 in the electronic device 310. However, the electronic device 310 may alternatively include multiple interface/connectors, such that different types of interface/connectors may be implemented at an owner information insertion point 320 and an owner control information insertion point 330. Although only a single owner control information insertion point 320 and owner control information insertion point 330 are shown in FIG. 8, a complete insertion system may include more than one of each type of insertion point. In a large company, for example, corporate computer system administrators may be authorized to perform owner information insertion operations from administrator computer systems, or from any corporate computer system from which administrative functions can be accessed, thereby providing multiple owner information insertion points 320. Similarly, when an owner allows users to insert digitally signed owner control information onto electronic devices, each user's computer system may be used as an owner control information insertion point 330.

FIG. 9 is a block diagram of an electronic device in which a system and method of owner application control can be implemented. In FIG. 9, the electronic device is a mobile device 430 adapted to operate within a wireless network. Also shown in FIG. 9 is an insertion tool 464 used to insert owner information onto the mobile device 430.

It should be apparent to those skilled in the art that only some of the components involved in an owner control system are shown in FIG. 9. A mobile device typically includes further components in addition to those shown in FIG. 9. Also, the mobile device 430 is an illustrative example of an electronic device for which an owner may wish to enforce some sort of usage policy. An owner may also wish to control the usage of other types of computerized electronic devices, such as mobile telephones, laptop computers and PDAs, for example.

As shown in FIG. 9, a mobile device 430 comprises a memory 432, a processor 440, an application loader 442, an insertion module 444, a user interface (UI) 446, a wireless transceiver 448, and an interface/connector 450. The memory 432 includes the enhanced reset logic at 439 and preferably also includes a software applications store 434, an owner information store 436, an authorization record store 438, as well as possibly other data stores associated with other device systems in addition to those shown in FIG. 9, such as a checking data store to store assurance period(s).

The memory 432 is a writable store such as a RAM or Flash memory into which other device components may write data. However, write and erase access to the software application store 434, the owner information store 436, and the authorization record store 438 is preferably restricted, but need not be in all implementations. For example, a user of the mobile device 430 may be able to retrieve data from the stores 434, 436, and 438, but write and erase operations for these stores may be controlled, as described below. The software application store 434 includes software applications that have been installed on the mobile device 430, and may include, for example, a digital certificate checking application, an electronic messaging application, a personal information management (PIM) application, games, as well as other applications. The owner information store 436 stores information such as an owner name or other identification, data integrity and source authentication information, such as a digital signature public key associated with a digital signature private key of the owner. Owner control information, in which an owner of the mobile device 430 specifies usage permissions and restrictions for the mobile device 430, is stored in an authorization record in the authorization record store 438. Such authorization records can include one or more of the aforementioned required, allowed and/or excluded application lists.

The processor 440 is connected to the wireless transceiver 448 and thus enables the mobile device 430 for communications via a wireless network. The application loader 442 and insertion module 444, described in further detail below, are connected to the interface/connector 450 to allow communication with the insertion tool 464, through the co-operating interface/connector 452.

The UI 446 includes one or more UI components, such as a keyboard or keypad, a display, or other components which accept inputs from or provide outputs to a user of the mobile device 430. Although shown as a single block in FIG. 9, it should be apparent that a mobile device 430 typically includes more than one UI, and the UI 446 is therefore intended to represent one or more user interfaces.

The insertion tool 464 includes an owner information store 460 and an interface/connector 452 through which information is exchanged with the mobile device 430, and thus represents an owner information insertion point 320 (FIG. 8). As described above, an owner information insertion point such as the insertion tool 464 may be controlled by an owner of an electronic device. Therefore, the insertion tool 464 is, for example, implemented on an administrator computer system used by an authorized administrator to enable services for or otherwise configure the mobile device 430. Because networked computer systems can typically be used by any user, the insertion tool 464 may instead be accessible to any computer system in a corporate network, dependent upon the particular user that is currently "logged on" the computer system.

The owner information store 460 stores owner information to be inserted onto the mobile device 430, and may be implemented, for example, on a local memory component such as a RAM chip, a flash memory device, or a hard disk drive. When the insertion tool 464 is implemented in a networked computer system or other network-connected device, the owner information store 460 may be a remote memory system such as a file server that is accessible to the insertion tool 464 through a network connection. The owner information store 460 may instead incorporate a memory reader such as a smart card reader, a memory card reader, a floppy disk drive, or a CD or DVD drive, for example.

Information is transferred between the insertion tool 464 and the mobile device 430 via a communication link established between the interface/connectors 450 and 452. The interface/connectors 450 and 452 could be any of a plurality of compatible data transfer components, including, for example, optical data transfer interfaces such as Infrared Data Association (IrDA) ports, other short-range wireless communications interfaces, or wired interfaces such as serial or Universal Serial Bus (USB) ports and connections. Known short-range wireless communications interfaces include, for example, "Bluetooth" modules and 802.11 modules according to the Bluetooth or 802.11 specifications, respectively. It will be apparent to those skilled in the art that Bluetooth and 802.11 denote sets of specifications, available from the Institute of Electrical and Electronics Engineers (IEEE), relating to wireless LANs and wireless personal area networks, respectively. Therefore, a communication link between the insertion tool 464 and the mobile device 430 may be a wireless connection or a physical wired connection.

Because communications between the insertion tool 464 and the mobile device 430 need not necessarily be accomplished using a physical connection, references to connecting a mobile device to an insertion tool include establishing communications through either physical connections or wireless transfer schemes. Thus, the mobile device 430 could be connected to the insertion tool 464 by connecting serial ports on the mobile device 430 and the insertion tool 464, by positioning the mobile device 430 such that an optical port thereof is in a line of sight of a similar port of the insertion tool 464, or by connecting or arranging the mobile device 430 and the insertion tool 464 in some other manner so that data may be exchanged. The particular operations involved in establishing communications between a mobile device and an insertion tool are dependent upon the types of interfaces and/or connectors available in both the mobile device and the insertion tool.

Owner branding of the mobile device 430 may be facilitated by inserting owner information onto the mobile device 430 using the insertion tool 464 before the mobile device 430 is operable by a user. This may be accomplished, for example, by pre-loading owner information before the mobile device 430 is provided to the user by the owner, or before the mobile device 430 is configured for use. In the former example, the owner maintains physical control of the mobile device 430 until owner information has been loaded, whereas in the latter example, the user has possession of the mobile device 430 but preferably is unable to make use of the device until it is configured by, or at least under the control of, the owner.

Pre-loading of owner information onto the mobile device 430 is performed using the insertion tool 464. As described briefly above, the insertion tool 464 may be a computer system associated with an a owner system administrator, or a computer system which may be used by a mobile device user or administrator. Depending upon the owner information pre-loading scheme, the insertion tool 464 is operated by a mobile device user or an administrator.

When the mobile device 430 has been connected to the insertion tool 464, owner information is retrieved from the owner information store 460 and transferred to the mobile device 430 through the interface/connectors 452 and 450, and passed to the insertion module 444 on the mobile device 430, which stores the owner information to the owner information store 436 in the memory 432.

Although the insertion module 444 is shown in FIG. 9 as being connected to the interface/connector 450, this module is normally implemented as a software module or application that is executed by the processor 440. As such, data transfers to and from the interface/connector 450 may actually be accomplished by routing data through the processor 440 to the interface/connector 450. In this case, the processor 440 may be instructed by the insertion tool 464 to start the insertion module 444 before the owner information is transferred to the mobile device 430. Alternatively, the processor 440 may be configured to start the insertion module 444 whenever owner information is received. The insertion tool 464 may similarly be a software module or application that is executed by a processor (not shown) in a computer system or device on which the insertion tool 464 operates.

The owner information that is pre-loaded onto the mobile device 430 may include data integrity and/or source authentication information, such as a cryptographic system like a digital signature public key which corresponds to a digital signature private key used by the owner to digitally sign information before it is transferred to the mobile device 430. Pre-loading of the data integrity and/or source authentication information enables greater security of owner control operations. Owner information may also include, for example, a name or other identifier associated with the owner of the mobile device 430.

In an owner control scheme in which digital signatures are used to verify data integrity and authenticate a source of data, when the owner's digital signature public key has been inserted into the owner information store 436 on the mobile device 430, owner control information, which specifies permissions and/or restrictions for the mobile device 430, is inserted onto the mobile device 430. Although an owner information insertion point, insertion tool 464, is shown in FIG. 9, it will be apparent from FIG. 8 and the above description that owner control, information is usually inserted onto an electronic device after the device has been branded by inserting owner information onto the device. An owner control information insertion tool (not shown) configured for use with the mobile device 430 is similar to the insertion tool 464, including an owner control information store and an interface/connector compatible with the interface/connector 450. Owner control information is inserted onto the mobile device 430 and stored in the form of an authorization record in the authorization record store 438. In an authorization record, an owner of the mobile device 430 specifies a list of software applications that a user is authorized to install on the mobile device 430, as well as possibly a list of required software applications that must be installed on the mobile device 430.

In order to prevent a user from inserting false owner control information to thereby circumvent owner control, owner control information is preferably digitally signed using the owner's digital signature private key before being transferred to the mobile device 430. The insertion module 444 is preferably configured to verify the digital signature before the owner control information is stored on the mobile device 430. If digital signature verification fails, then the owner control information is not stored on the mobile device 430.

Digital signature schemes generally involve some sort of transformation of digitally signed information to provide for checking the integrity of the information and authentication of a source of the signed information. For example, according to one known digital signature technique, a digest of information to be digitally signed is first generated using a non-reversible digest algorithm or transformation. Known digest algorithms include Secure Hashing Algorithm 1 (SHA-1) and Message-Digest algorithm 5 (MD5). Other digest techniques that produce a unique digest for each unique input may also be used. The digest is then further transformed using a digital signature private key and a signature algorithm to generate a digital signature. In digital signature verification, a digital signature public key corresponding to the private key is used.

In the context of owner control and owner control information, insertion of the owner's digital signature public key on a mobile device 430 as part of the owner information provides for digital signature-based security of owner control information. If all owner control information is digitally signed before transfer to the mobile device 430, then the insertion module 444 can verify that owner control information has actually been signed using the owner's digital signature private key, known only to the owner, and that the owner control information has not been changed since it was signed. In this manner, only owner control information that originates with the owner of a mobile device 430 is stored to and used on the mobile device 430.

Owner control information is obtained by an owner control information insertion tool from an owner control information store, which may be a remote data store accessible to the insertion tool, a local store, or some form of memory reader, as described above. Owner control information is established based on a set of software applications or functions (e.g., a digital certificate checking routine) or data (e.g., assurance period(s)) that the owner wishes to authorize on an electronic device. Such owner control information could then be digitally signed by a secure computer system or software component to which only administrators have access, using the owner's digital signature private key. In this case, signed owner control information is then stored at a location that is accessible to administrator computer systems and possibly other computer systems, and retrieved by an owner control information insertion tool as required. The owner control information insertion tool then transfers the signed owner control information to the mobile device 430. Depending upon how often owner control information changes or is expected to change, the signed owner control information may be further distributed to each computer system in a network in order to provide local access to signed owner control information. When new owner control information is generated and signed, the signed new owner control information preferably replaces all existing copies of the owner control information, as described in further detail below. Wide distribution of owner control information provides easier access to the owner control information, whereas shared remote storage of owner control information requires fewer updates when new owner control information is established.

It is also possible to support digital signature generation for owner control information on an owner control information insertion tool. However, in the present example, this would require that the owner control information insertion tool has access to the owner's digital signature private key.

Unless otherwise desired, digital signing of owner control information only by secure computer systems or components is generally preferred in that it limits the number of computer systems that can access the owner's digital signature private key.

When signed owner control information is transferred to the insertion module 444, digital signature verification operations are performed. If the digital signature is verified, then the owner control information is stored on the mobile device 430 in the authorization record store 438. Otherwise, the owner control information is not stored. In the event of a digital signature verification failure, an error or like indication may be output to a user on a UI 446 such as a display, an error message may be returned to the owner control information insertion tool, and an indication of the failure may also be output to a user of the owner control information insertion tool. When owner control information insertion fails, retry or other error processing operations may be performed on the owner control information insertion tool, the mobile device 430, or both.

A first owner information insertion operation for any mobile device 430 is preferably either performed or authorized by an administrator, in order to ensure that accurate owner control information is inserted onto the mobile device 430. This prevents a user from circumventing owner control by inserting a digital signature public key other than the owner's digital signature public key onto the mobile device 430.

When owner control information changes, where an owner wishes to expand or further restrict the use of an electronic device, for example, any existing owner control information preferably should be replaced. As described above, new owner control information is preferably digitally signed, and the signed new owner control information is distributed to one or more locations from which it is retrieved for insertion onto electronic devices.

Any of several mechanisms for subsequent distribution of signed new owner control information to electronic devices are possible. When new owner control information is distributed to each owner control information insertion tool, the insertion tool may be configured to detect receipt of new owner control information, and to transfer the new owner control information to the mobile device 430 the next time the mobile device 430 is connected to the owner control information insertion tool. As described above, an owner control information insertion point 330 (FIG. 8), such as an owner control information insertion tool, may be controlled by a user of an electronic device. Many modern electronic devices are configured to be synchronized with computer systems. In such systems, this type of owner control information distribution may be supported by implementing an owner information control insertion tool in a user's computer system. New owner control information is then transferred to the electronic device the next time the electronic device is synchronized with the computer system.

Initial storage of owner control information, as well as replacement of existing owner control information, is in this example thereby dependent upon verification of a digital signature by the insertion module 444. Those skilled in the art will appreciate that other checks may also be performed before existing information is replaced. In order to prevent replay attacks, in which old owner control information is received by the electronic device, owner control information preferably includes version information. Existing owner control information is replaced only where received owner control information is newer than the existing owner control information. Generally, newer owner control information has a higher version number.

Although owner information is inserted onto the mobile device 430 using the insertion tool 464 as described above, changes to existing owner information, such as when the owner's digital signature private/public key pair is changed, may alternatively be updated on the mobile device 430 using digital signature techniques. To this end, the insertion tool 464 may include other types of communication modules (not shown), such as a wireless transceiver or network connector, for example, that are less secure than the interface/connector 452. In that case, any such updates are dependent upon verification of a digital signature using a digital signature public key in existing owner information.

The foregoing description relates primarily to writing owner information and owner control information to memory on an electronic device such as the mobile device 430. However, an owner may also wish to erase owner information and owner control information, without replacing existing information with new information. In this case, because information is not being written to memory on a device, no signed owner information or owner control information would be sent to the device. Instead, an erase command or request may be sent to the device. Erasure may be a further function supported by the insertion module 444.

If owner information is to be erased from the owner information store 436, then an erase command or request is digitally signed and sent to the insertion module 444. As with new owner information or owner control information, a signed command or request could be sent to the mobile device 430 through either the interface/connector 450 or the wireless transceiver 448. The insertion module 444, using the owner's digital signature public key, executes the command or completes the request only if a digital signature is verified. Otherwise, the command or request may be ignored, and an error or failure indication may be displayed to a user on a UI 446 on the mobile device 430, returned to a sending system or device that sent the command or request, or both. Further error or failure processing routines may then be performed at the sending system or device.

Since owner information includes the owner's digital signature public key in a signature-based owner control scheme, erasure of owner information may be tightly controlled. For example, only owner system administrators may be authorized to send erase commands or requests. Sending of signed commands or requests to the mobile device 430 is therefore preferably restricted to administrator computer systems or accounts, an owner information insertion tool, or an owner-controlled erasure tool. For example, an insertion tool such as the insertion tool 464 could be adapted to erase existing owner information from the mobile device 430 by providing an erase command generator or store which is also coupled to the interface/connector 452. Alternatively, owner information erasure could be accomplished using a specialized, owner-controlled erasure tool incorporating such an erase command generator or store and an interface to the mobile device 430. Erasure of owner control information is preferably controlled in a similar manner.

Where an owner control system is configured to support erasure and possibly other owner information and owner control information management functions, access to the owner's digital signature private key is preferably restricted in order to control the information, requests, and commands that can be digitally signed and sent to an electronic device. The digital signature private key or digital signature generation functions may be accessible only to specific computer systems or administrator login accounts, for example.

As shown in FIG. 9, other systems on the mobile device 430 have access to the memory 432. Preferably, no device system should be able to insert, change, or erase owner information or owner control information without submitting properly signed information or commands. Any data stores, such as the owner information store 436 and the authorization record store 438, that store owner information or owner control information are therefore preferably located in protected memory areas. Preferably, only the insertion module 444 has write and erase access to these stores, such that digital signature-based control of insertion and erasure of owner information and owner control information is maintained. Other device systems have read only access to owner information and owner control information. In one possible implementation, any systems or components through which the memory 432 is accessible are configured to allow memory read operations from any locations in the memory 432, but deny any write or erase operations to memory locations storing owner information or owner control information unless the operations originate with or are authorized by the insertion module 444. In an alternative implementation, a memory manager (not shown) is provided to manage all memory access operations. Such a memory manager is configured to direct any write or erase operations involving owner information or owner control information stores to the insertion module 444 for digital signature checking and authorization before completing the operations. Owner information and owner control information may thereby be read by other device systems, but preferably may only be inserted, changed, or erased when a digital signature is verified.

It should be appreciated that the above public key digital signature operations are intended only as an illustrative example. Other digital signature schemes, or other data integrity checking and source authentication schemes, may instead be used to verify the integrity and source of owner control information or commands. Further, the authentication and security described herein above are preferably used to transfer the owner application control information; however, various systems and methods of owner application control need not use authentication and/or secure transmission in order to achieve the desired owner application control as described herein.

In the mobile device 430, owner control information is included in an authorization record that is stored in the authorization record store 438. An authorization record specifies particular software applications that are authorized for installation on the mobile device 430, and may also specify required software applications (e.g., digital validity checking module 152) and data (e.g., assurance period(s)) that must be installed and used on the mobile device 430. Such an authorization record provides an electronic device owner with relatively tight control of how a user makes use of the mobile device 430, since only authorized software applications and/or data can be loaded onto the device.

For authorized or required applications, some systems can provide a more fine grained control within the authorization record(s). In such systems, the owner can provide more specific controls on the operations that installed application can perform. Such controls can be specified on an individual application basis, or in some cases by groups of applications. Such operation controls can determine whether an application can connect to external resources, and if so, the channels that may be used for such connections, can communicate with other applications executing on the device and/or can access part or all of local memory on the device.

Software application loading operations are enabled on the mobile device 430 by the application loader 442. As described above in regard to the insertion module 444, although the application loader 442 is shown as being connected to the interface/connector 450, information may actually be exchanged between the application loader 442 and the interface/connector 450 or the wireless transceiver 448 through the processor 440.

Like owner information and owner control information, software applications may be received by the mobile device 430 via the interface/connector 450 or the wireless transceiver 448. One possible source of software applications configured for operation on the mobile device 430 is a user's computer system equipped with an interface/connector compatible with the interface/connector 450. When the computer system is connected to a corporate LAN, for example, software applications provided by a corporate owner of the mobile device 430 may be retrieved from a file server on the LAN or other store on the LAN, and transferred to the mobile device. A computer system may also or instead obtain software applications for the mobile device 430 from a local store, or other sources, such as Internet-based sources, with which the computer system may communicate.

The application loader 442 is preferably configured to determine whether owner control information is stored on the mobile device 430 whenever a software application is received. If no owner control information is present on the mobile device 430, then no owner controls have been established for the mobile device 430, and the software application is installed. Alternatively, the application loader 442 could consult a remote server for an owner control information update prior to attempting the installation. Software application installation typically involves such operations as storing a received application file to the software application store 434 in the memory 432, extracting files for storage to the software application store 434, or possibly executing an installation program or utility. If owner control information is subsequently inserted onto the mobile device 430, existing software applications are preferably checked by either the application loader 442 or the insertion module 444 to ensure that all software applications resident on the mobile device 430 are authorized software applications. Any software applications that have not been authorized are erased from the mobile device 430 or otherwise rendered inoperable.

In some circumstances, owner information may have been inserted onto an electronic device, but owner control information has yet to be inserted. In order to prevent loading of a software application onto the mobile device 430 that subsequently inserted owner control information does not authorize, the mobile device 430 may be substantially disabled, permitting only a limited subset of device functions to be executed, until owner control information is inserted. Alternatively, the application loader 442 may be configured to determine whether owner information is present on the mobile device 430 when a software application is received. Where owner information is found, indicating that owner control information will be established and used for the mobile device 430, the application loader 442 then determines whether owner control information has been inserted. In the event that owner information but not owner control information is found, the application loader 442 does not load the received software application. Error processing operations may then be performed, such as purging the received software application from any temporary memory location in which it was stored when received, and, if memory resources on the mobile device 430 permit, storing the received software application on the mobile device 430 in such a way that it is not executable. Any software applications stored in this manner are then processed by the application loader 442 when owner control information is inserted onto the mobile device 430. Although software applications are stored on the mobile device 430 in this embodiment, they would not be usable until owner control information is inserted onto the mobile device 430, and it is confirmed that the software applications are authorized for installation. The amount of memory space made available for such software applications may occupy is preferably limited, so that available memory space will not be depleted by storing unchecked and possibly unauthorized software applications.

When the application loader 442 determines that owner control information has been inserted onto the mobile device 430, the application loader 442 then determines whether the received software application is authorized for installation on the mobile device 430. If the owner control information includes an authorized software application list, the application loader 442 searches the list to determine whether the received software application is one of the authorized software applications. An authorized software application list preferably includes information that uniquely identifies the authorized software applications, such as a hash of the software application source code or executable code, for example. Because a software application developer is free to choose a file name for any software application, file names may not provide a reliable authorization check. However, if an owner generates a hash of each authorized software application and includes the hash in the owner control information that is inserted onto the mobile device 430, then only particular versions of authorized software applications can be installed on the mobile device 430. The application loader 442 generates a hash of any received software application, and installs the software application only if the generated hash matches a hash in the owner control information. In order to support different hashing algorithms on different electronic devices, a device owner generates more than one hash of each software application and includes each hash in the owner control information inserted onto each owned electronic device. An electronic device may then use any of a number of different hashing algorithms to generate a hash of a received software application. Of course, other unique transformations than hashes could also be used to generate owner control information and to determine whether received software applications are authorized for installation.

Owner control information may also include a required software application list that uniquely identifies software applications that the owner of an electronic device establishes as mandatory. A required software application list allows an owner to ensure that every owned electronic device supports certain core functions, such as electronic messaging and secure communications, for example. Software applications in a required software application list may be uniquely identified by one or more hashes, as described above in the context of authorized applications. The processor 440, application loader 442, insertion module 444, or a further device component or system is configured to periodically check to ensure that each required software application is present on the mobile device 430, and that a hash of each required software application matches a hash in the required software application list. Where a required software application is not present on the device or its hash does not match a hash in the required software application list, which would occur when a software application has been changed, the mobile device 430, or at least some of its functions, can be rendered unusable. Alternatively, the mobile device 430 can download and install missing or corrupted applications transparently to the user of the device; after successful installation of all required programs, the device is restored to operability.

The systems and methods disclosed herein are presented only by way of example and are not meant to limit the scope of the invention. Other variations of the systems and methods described above will be apparent to those skilled in the art and as such are considered to be within the scope of the invention. For example, when a required reset has been detected the user is shown a message, "Your device requires a reset for the following reason [insert reason here]. If you have any unsaved work, choose Reset Later. Reminder 1 of 5." The user is given the options "Reset Now" and "Reset Later". If the user chooses "Reset Now", the device is reset right away. If the user chooses "Reset Later", they are given 10 min to save their work. In 10 minutes time the user is asked again to reset (Reminder 2 of 5). The user is given 4 opportunities to save their work. On the last reminder the user is not given the choice of "Reset Later". The only choice is "Reset Now". The number of reminders and period between reminders could be configurable by the IT administrator. This gives the user ample time to save any work, ensures the reset is completed in a timely fashion and gives the user enough information to know that the device is not spontaneously resetting due to a device fault.

Figure 10:
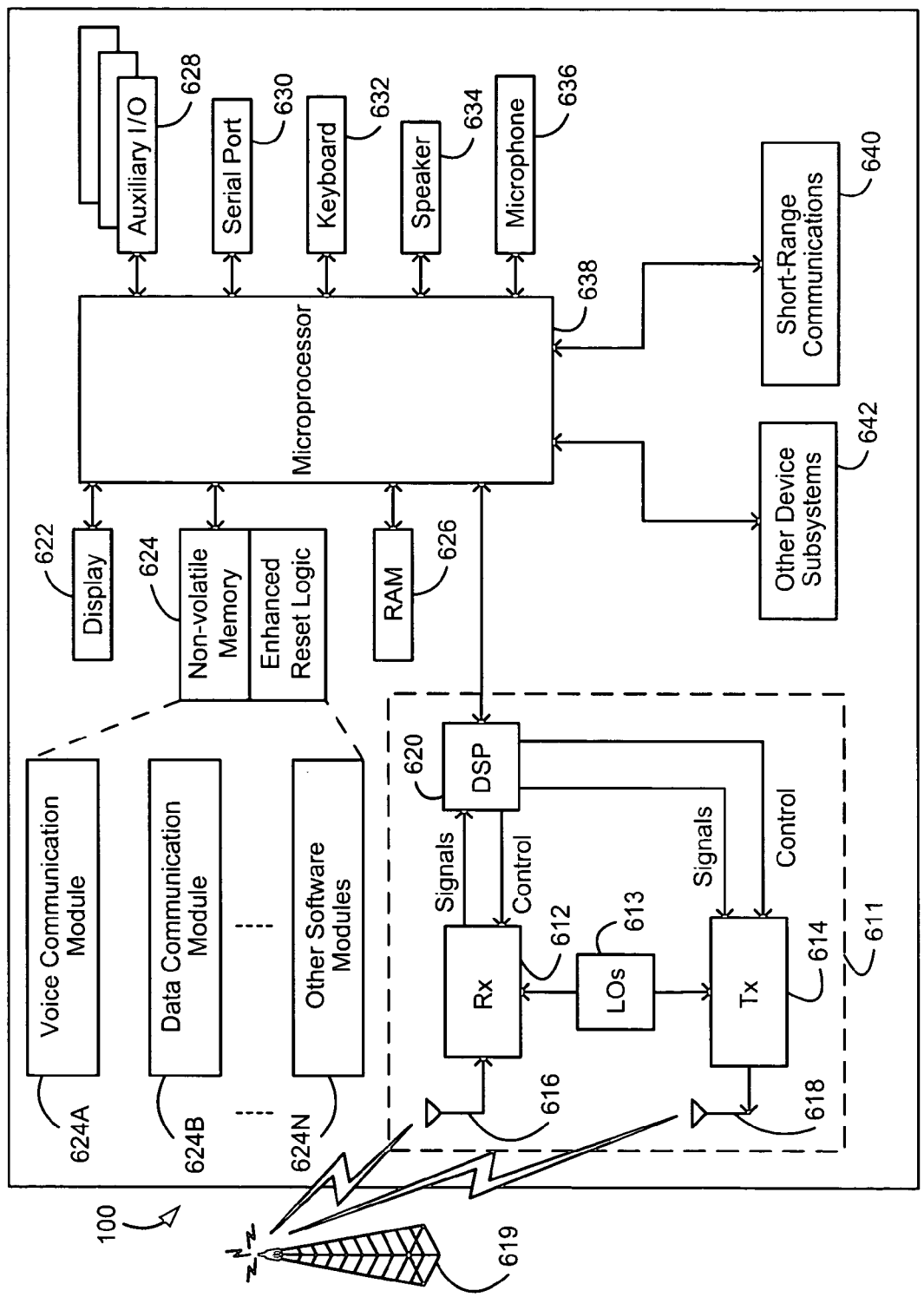
FIG. 10 is a block diagram of an exemplary mobile device utilizing an exemplary embodiment of this invention.

As an example, the systems and methods disclosed herein may be used with many different computers and devices, such as a wireless mobile communications device shown in FIG. 10. With reference to FIG. 10, the mobile device 100 is a dual-mode mobile device and includes a transceiver 611, a microprocessor 638, a display 622, non-volatile memory 624 (which includes the enhanced reset logic), random access memory (RAM) 626, one or more auxiliary input/output (I/O) devices 628, a serial port 630, a keyboard 632, a speaker 634, a microphone 636, a short-range wireless communications sub-system 640, and other device subsystems 642.

The transceiver 611 includes a receiver 612, a transmitter 614, antennas 616 and 618, one or more local oscillators 613, and a digital signal processor (DSP) 620. The antennas 616 and 618 may be antenna elements of a multiple-element antenna, and are preferably embedded antennas. However, the systems and methods described herein are in no way restricted to a particular type of antenna, or even to wireless communication devices.

The mobile device 100 is preferably a two-way communication device having voice and data communication capabilities. Thus, for example, the mobile device 100 may communicate over a voice network, such as any of the analog or digital cellular networks, and may also communicate over a data network. The voice and data networks are depicted in FIG. 10 by the communication tower 619. These voice and data networks may be separate communication networks using separate infrastructure, such as base stations, network controllers, etc., or they may be integrated into a single wireless network.

The transceiver 611 is used to communicate with the network 619, and includes the receiver 612, the transmitter 614, the one or more local oscillators 613 and the DSP 620. The DSP 620 is used to send and receive signals to and from the transceivers 616 and 618, and also provides control information to the receiver 612 and the transmitter 614. If the voice and data communications occur at a single frequency, or closely-spaced sets of frequencies, then a single local oscillator 613 may be used in conjunction with the receiver 612 and the transmitter 614. Alternatively, if different frequencies are utilized for voice communications versus data communications for example, then a plurality of local oscillators 613 can be used to generate a plurality of frequencies corresponding to the voice and data networks 619. Information, which includes both voice and data information, is communicated to and from the transceiver 611 via a link between the DSP 620 and the microprocessor 638.

The detailed design of the transceiver 611, such as frequency band, component selection, power level, etc., will be dependent upon the communication network 619 in which the mobile device 100 is intended to operate. For example, a mobile device 100 intended to operate in a North American market may include a transceiver 611 designed to operate with any of a variety of voice communication networks, such as the Mobitex or DataTAC mobile data communication networks, AMPS, TDMA, CDMA, PCS, etc., whereas a mobile device 100 intended for use in Europe may be configured to operate with the GPRS data communication network and the GSM voice communication network. Other types of data and voice networks, both separate and integrated, may also be utilized with a mobile device 100.

Depending upon the type of network or networks 619, the access requirements for the mobile device 100 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will be unable to carry out any functions involving communications over the data network 619, other than any legally required operations, such as '911' emergency calling.

After any required network registration or activation procedures have been completed, the mobile device 100 may the send and receive communication signals, including both voice and data signals, over the networks 619. Signals received by the antenna 616 from the communication network 619 are routed to the receiver 612, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 620. In a similar manner, signals to be transmitted to the network 619 are processed, including modulation and encoding, for example, by the DSP 620 and are then provided to the transmitter 614 for digital to analog conversion, frequency up conversion, filtering, amplification and transmission to the communication network 619 via the antenna 618.

In addition to processing the communication signals, the DSP 620 also provides for transceiver control. For example, the gain levels applied to communication signals in the receiver 612 and the transmitter 614 may be adaptively controlled through automatic gain control algorithms implemented in the DSP 620. Other transceiver control algorithms could also be implemented in the DSP 620 in order to provide more sophisticated control of the transceiver 611.

The microprocessor 638 preferably manages and controls the overall operation of the mobile device 100. Many types of microprocessors or microcontrollers could be used here, or, alternatively, a single DSP 620 could be used to carry out the functions of the microprocessor 638. Low-level communication functions, including at least data and voice communications, are performed through the DSP 620 in the transceiver 611. Other, high-level communication applications, such as a voice communication application 624A, and a data communication application 624B may be stored in the non-volatile memory 624 for execution by the microprocessor 638. For example, the voice communication module 624A may provide a high-level user interface operable to transmit and receive voice calls between the mobile device 100 and a plurality of other voice or dual-mode devices via the network 619. Similarly, the data communication module 624B may provide a high-level user interface operable for sending and receiving data, such as e-mail messages, files, organizer information, short text messages, etc., between the mobile device 100 and a plurality of other data devices via the networks 619.

The microprocessor 638 also interacts with other device subsystems, such as the display 622, the RAM 626, the auxiliary input/output (I/O) subsystems 628, the serial port 630, the keyboard 632, the speaker 634, the microphone 636, the short-range communications subsystem 640 and any other device subsystems generally designated as 642.

Some of the subsystems shown in FIG. 10 perform communication-related functions, whereas other subsystems may provide "resident" or on-device functions. Notably, some subsystems, such as the keyboard 632 and the display 622 may be used for both communication-related functions, such as entering a text message for transmission over a data communication network, and device-resident functions such as a calculator or task list or other PDA type functions.

Operating system software used by the microprocessor 638 is preferably stored in a persistent store such as non-volatile memory 624. The non-volatile memory 624 may be implemented, for example, as a Flash memory component, or as battery backed-up RAM. In addition to the operating system, which controls low-level functions of the mobile device 610, the non-volatile memory 624 includes a plurality of software modules 624A-624N that can be executed by the microprocessor 638 (and/or the DSP 620), including a voice communication module 624A, a data communication module 624B, and a plurality of other operational modules 624N for carrying out a plurality of other functions. These modules are executed by the microprocessor 638 and provide a high-level interface between a user and the mobile device 100. This interface typically includes a graphical component provided through the display 622, and an input/output component provided through the auxiliary I/O 628, keyboard 632, speaker 634, and microphone 636. The operating system, specific device applications or modules, or parts thereof, may be temporarily loaded into a volatile store, such as RAM 626 for faster operation. Moreover, received communication signals may also be temporarily stored to RAM 626, before permanently writing them to a file system located in a persistent store such as the Flash memory 624.

An exemplary application module 624N that may be loaded onto the mobile device 100 is a personal information manager (PIM) application providing PDA functionality, such as calendar events, appointments, and task items. This module 624N may also interact with the voice communication module 624A for managing phone calls, voice mails, etc., and may also interact with the data communication module for managing e-mail communications and other data transmissions. Alternatively, all of the functionality of the voice communication module 624A and the data communication module 624B may be integrated into the PIM module.

The non-volatile memory 624 preferably also provides a file system to facilitate storage of PIM data items on the device. The PIM application preferably includes the ability to send and receive data items, either by itself, or in conjunction with the voice and data communication modules 624A, 624B, via the wireless networks 619. The PIM data items are preferably seamlessly integrated, synchronized and updated, via the wireless networks 619, with a corresponding set of data items stored or associated with a host computer system, thereby creating a mirrored system for data items associated with a particular user.

Context objects representing at least partially decoded data items, as well as fully decoded data items, are preferably stored on the mobile device 100 in a volatile and non-persistent store such as the RAM 626. Such information may instead be stored in the non-volatile memory 624, for example, when storage intervals are relatively short, such that the information is removed from memory soon after it is stored. However, storage of this information in the RAM 626 or another volatile and non-persistent store is preferred, in order to ensure that the information is erased from memory when the mobile device 100 loses power. This prevents an unauthorized party from obtaining any stored decoded or partially decoded information by removing a memory chip from the mobile device 100, for example.

The mobile device 100 may be manually synchronized with a host system by placing the device 100 in an interface cradle, which couples the serial port 630 of the mobile device 100 to the serial port of a computer system or device. The serial port 630 may also be used to enable a user to set preferences through an external device or software application, or to download other application modules 624N for installation. This wired download path may be used to load an encryption key onto the device, which is a more secure method than exchanging encryption information via the wireless network 619. Interfaces for other wired download paths may be provided in the mobile device 100, in addition to or instead of the serial port 630. For example, a USB port would provide an interface to a similarly equipped personal computer.

Additional application modules 624N may be loaded onto the mobile device 100 through the networks 619, through an auxiliary I/O subsystem 628, through the serial port 630, through the short-range communications subsystem 640, or through any other suitable subsystem 642, and installed by a user in the non-volatile memory 624 or RAM 626. Such flexibility in application installation increases the functionality of the mobile device 100 and may provide enhanced on-device functions, communication-related functions, or both. For example, secure communication applications may enable electronic commerce functions and other such financial transactions to be performed using the mobile device 100.

When the mobile device 100 is operating in a data communication mode, a received signal, such as a text message or a web page download, is processed by the transceiver module 611 and provided to the microprocessor 638, which preferably further processes the received signal in multiple stages as described above, for eventual output to the display 622, or, alternatively, to an auxiliary I/O device 628. A user of mobile device 100 may also compose data items, such as e-mail messages, using the keyboard 632, which is preferably a complete alphanumeric keyboard laid out in the QWERTY style, although other styles of complete alphanumeric keyboards such as the known DVORAK style may also be used. User input to the mobile device 100 is further enhanced with a plurality of auxiliary I/O devices 628, which may include a thumbwheel input device, a touchpad, a variety of switches, a rocker input switch, etc. The composed data items input by the user may then be transmitted over the communication networks 619 via the transceiver module 611.

When the mobile device 100 is operating in a voice communication mode, the overall operation of the mobile device is substantially similar to the data mode, except that received signals are preferably be output to the speaker 634 and voice signals for transmission are generated by a microphone 636. Alternative voice or audio I/O subsystems, such as a voice message recording subsystem, may also be implemented on the mobile device 100. Although voice or audio signal output is preferably accomplished primarily through the speaker 634, the display 622 may also be used to provide an indication of the identity of a calling party, the duration of a voice call, or other voice call related information. For example, the microprocessor 638, in conjunction with the voice communication module and the operating system software, may detect the caller identification information of an incoming voice call and display it on the display 622.

A short-range communications subsystem 640 is also included in the mobile device 100. The subsystem 640 may include an infrared device and associated circuits and components, or a short-range RF communication module such as a Bluetooth™ module or an 802.11 module, for example, to provide for communication with similarly-enabled systems and devices. Those skilled in the art will appreciate that "Bluetooth" and "802.11" refer to sets of specifications, available from the Institute of Electrical and Electronics Engineers, relating to wireless personal area networks and wireless local area networks, respectively.

Those in the art will appreciate that many changes, modifications and alterations may be made in the exemplary embodiments while yet retaining novel advantages and benefits of this invention. Accordingly, all such changes, modifications and alterations within the scope of the appended claims are included examples of this invention.

What is claimed is:

1. A method for surely but conveniently causing reset of a computer-based device, said method comprising:
   (a) starting a device resetting process when resetting has been determined to be desirable;
   (b) as a part of said resetting process, providing N successive instances of a user option, N being greater than one, for either (i) resetting the device and ending said resetting process or (ii) continuing to enjoy further use of the device without resetting it, wherein each of said N successive instances include a user-readable notification of the sequential number of that option; and
   (c) as a further part of said resetting process and at a time subsequent to step (b) if a user option to reset the device has not yet been taken, then forcing device reset to occur before ending said resetting process and permitting further use of the device.

2. A method as in claim 1 wherein step (a) can be initiated by an entity other than a user of the device.

3. A method as in claim 2 wherein step (a) is initiated by an owner of the device who is not an assigned user of the device.

4. A method as in claim 2 wherein step (a) is automatically initiated by downloading of a computer program or other digital data.

5. A method as in claim 1 wherein a predetermined time delay is provided between the occurrence of successive ones of said instances.

6. A method as in claim 1 wherein said option is presented with a user-readable notification of the need to reset.

7. A method as in claim 1 wherein the user-readable notification of the option also includes notification of the maximum number N of instances whereupon reset will be forced.

8. A method as in claim 1 wherein step (c) includes a final user option only to manually cause reset but with no other continued use option.

9. A method as in claim 1 wherein step (c) is performed automatically upon the expiration of a predetermined time after performance of step (b).

10. A method as in claim 1 further comprising providing a notification to the user of a pending required reset to facilitate user-initiated reset at a convenient time.

11. A method for surely but conveniently causing reset of a computer-based device, said method comprising:
  (a) providing N successive instances of a user option, N being greater than one, for either (i) resetting a computer-based device when resetting has been determined to be desirable, or (ii) continued use of the device without resetting it, wherein each of said N successive instances include a user-readable notification of the sequential number of that option; and
  (b) forcing reset of the device at a time subsequent to performance of step (a).

12. A method as in claim 11 wherein step (a) can be initiated by an entity other than a user of the device.

13. A method as in claim 12 wherein step (a) is initiated by an owner of the device who is not an assigned user of the device.

14. A method as in claim 12 wherein step (a) is automatically initiated by downloading of a computer program or other digital data.

15. A method as in claim 11 wherein a predetermined time delay is provided between the occurrence of successive ones of said instances.

16. A method as in claim 12 wherein said option is presented with a user-readable notification of the need to reset.

17. A method as in claim 11 wherein the user-readable notification of the option also includes notification of the maximum number N of instances whereupon reset will be forced.

18. A method as in claim 12 wherein step (b) includes a final user option only to manually cause reset but with no other continued use option.

19. A method as in claim 12 wherein step (b) is performed automatically upon the expiration of a predetermined time after performance of step (a).

20. A method as in claim 11 further comprising providing a notification to the user of a pending required reset to facilitate user-initiated reset at a convenient time.

21. Apparatus for surely but conveniently causing reset of a computer-based device, said apparatus comprising:
  (a) means for starting a device resetting process when resetting has been determined to be desirable;
  (b) means for providing N successive instances of a user option, N being greater than one, for either (i) resetting the device and ending said resetting process or (ii) continuing to enjoy further use of the device without resetting it, wherein each of said N successive instances include a user-readable notification of the sequential number of that option; and
  (c) means for forcing device reset to occur before ending said resetting process and permitting further use of the device if a user option to reset the device has not been timely taken.

22. Apparatus as in claim 21 wherein said means for starting can be initiated by an entity other than a user of the device.

23. Apparatus as in claim 22 wherein said means for starting is initiated by an owner of the device who is not an assigned user of the device.

24. Apparatus as in claim 22 wherein said means for starting is automatically initiated by downloading of a computer program or other digital data.

25. Apparatus as in claim 21 wherein a predetermined time delay is provided between the occurrence of successive ones of said instances.

26. Apparatus as in claim 21 wherein said option is presented with a user-readable notification of the need to reset.

27. Apparatus as in claim 21 wherein the user-readable notification of the option also includes notification of the maximum number N of instances whereupon reset will be forced.

28. Apparatus as in claim 21 wherein said means for forcing provides a final user option only manually cause reset but with no other continued use option.

29. Apparatus as in claim 21 wherein said means for forcing operates automatically upon the expiration of a predetermined time after operation of said means for providing.

30. Apparatus as in claim 21 further comprising means for providing a notification to the user of a pending required reset to facilitate user-initiated reset at a convenient time.

31. Apparatus for surely but conveniently causing reset of a computer-based device, said apparatus comprising:
  means for providing N successive instances of a user option, N being greater than one, for either (i) resetting a computer-based device when resetting has been determined to be desirable, or (ii) continued use of the device without resetting it, wherein each of said N successive instances include a user-readable notification of the sequential number of that option; and
  (b) means for forcing reset of the device at a time subsequent to operation of said means for providing.

32. A digital storage medium containing a computer program which, when executed, provides a method for surely but conveniently causing reset of a computer-based device, said storage medium comprising a computer program for:
  (a) starting a device resetting process when resetting has been determined to be desirable;
  (b) as a part of said resetting process, providing N successive instances of a user option, N being greater than one, for either (i) resetting the device and ending said resetting process or (ii) continuing to enjoy further use of the device without resetting it, wherein each of said N successive instances include a user-readable notification of the sequential number of that option; and
  (c) as a further part of said resetting process, and at a time subsequent to step (b), if a user option to reset the device has not yet been taken, then forcing device reset to occur before ending said resetting process and permitting further use of the device.

33. A digital storage medium containing a computer program which, when executed, provides a method for surely but conveniently causing reset of a computer-based device, said storage medium comprising a computer program for:
- (a) providing N successive instances of a user option, N being greater than one, for either (i) resetting a computer-based device when resetting has been determined to be desirable, or (ii) continued use of the device without resetting it, wherein each of said N successive instances include a user-readable notification of the sequential number of that option; and
- (b) forcing reset of the device at a time subsequent to performance of step (a).

* * * * *